United States Patent
Anderson et al.

(10) Patent No.: US 10,686,831 B2
(45) Date of Patent: Jun. 16, 2020

(54) MALWARE CLASSIFICATION AND ATTRIBUTION THROUGH SERVER FINGERPRINTING USING SERVER CERTIFICATE DATA

(71) Applicant: Cisco Technology, Inc., San Jose, CA (US)

(72) Inventors: Blake Harrell Anderson, San Jose, CA (US); David McGrew, Poolesville, MD (US); Subharthi Paul, Fremont, CA (US); Ivan Nikolaev, Praha-Vinohrady (CZ); Martin Grill, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 577 days.

(21) Appl. No.: 15/353,160

(22) Filed: Nov. 16, 2016

(65) Prior Publication Data
US 2018/0139214 A1 May 17, 2018

(51) Int. Cl.
*H04L 29/06* (2006.01)
*H04L 9/32* (2006.01)
*G06N 99/00* (2019.01)
*G06N 20/00* (2019.01)

(52) U.S. Cl.
CPC ........ *H04L 63/145* (2013.01); *H04L 63/0428* (2013.01); *H04L 63/1408* (2013.01); *G06N 20/00* (2019.01)

(58) Field of Classification Search
CPC . H04L 63/145; H04L 63/1408; H04L 63/306; G06N 99/005
See application file for complete search history.

(56) References Cited

U.S. PATENT DOCUMENTS

| | | | |
|---|---|---|---|
| 7,634,811 B1 * | 12/2009 | Kienzle | G06F 21/33 726/22 |
| 7,949,771 B1 | 5/2011 | Chen et al. | |
| 8,171,467 B1 * | 5/2012 | Li | G06F 8/65 717/171 |

(Continued)

OTHER PUBLICATIONS

Almishari, Mishari., "Machine-learning based security and privacy techniques for the modern web", 116 pages, 2012, ACM Digital Library, Long Beach, CA, California State University at Long Beach.

(Continued)

*Primary Examiner* — Joseph P Hirl
*Assistant Examiner* — Thomas A Gyorfi
(74) *Attorney, Agent, or Firm* — Behmke Innovation Group LLC; James M. Behmke; Jonathon P. Western

(57) ABSTRACT

In one embodiment, a device in a network receives certificate data for an encrypted traffic flow associated with a client node in the network. The device determines one or more data features from the certificate data. The device determines one or more flow characteristics of the encrypted traffic flow. The device performs a classification of an application executed by the client node and associated with the encrypted traffic flow by using a machine learning-based classifier to assess the one or more data features from the certificate data and the one or more flow characteristics of the traffic flow. The device causes performance of a network action based on a result of the classification of the application.

20 Claims, 7 Drawing Sheets

(56) References Cited

U.S. PATENT DOCUMENTS

| | | | | |
|---|---|---|---|---|
| 8,341,724 B1* | 12/2012 | Burns | ................ | H04L 63/0428 |
| | | | | 726/13 |
| 8,347,394 B1* | 1/2013 | Lee | ................... | H04L 61/1511 |
| | | | | 726/22 |
| 8,521,667 B2* | 8/2013 | Zhu | .................... | H04L 63/1408 |
| | | | | 706/13 |
| 9,363,269 B2* | 6/2016 | Srinivasan | ............ | H04L 63/10 |
| 9,363,282 B1* | 6/2016 | Yu | ....................... | H04L 63/1425 |
| 9,407,644 B1* | 8/2016 | Cheng | ................ | H04L 63/1408 |
| 9,419,942 B1* | 8/2016 | Buruganahalli | .... | H04L 63/0227 |
| 10,027,688 B2* | 7/2018 | Perdisci | .............. | H04L 63/1416 |
| 2012/0131330 A1* | 5/2012 | Tonsing | ............. | H04L 63/0464 |
| | | | | 713/153 |
| 2014/0157405 A1* | 6/2014 | Joll | .................... | H04L 63/1425 |
| | | | | 726/22 |
| 2015/0180892 A1* | 6/2015 | Balderas | ............ | H04L 63/1416 |
| | | | | 726/11 |
| 2015/0373043 A1* | 12/2015 | Wang | .................... | G06F 21/552 |
| | | | | 706/12 |
| 2016/0080363 A1 | 3/2016 | Taboso | | |
| 2017/0104778 A1* | 4/2017 | Shabtai | ................ | G06F 21/552 |

OTHER PUBLICATIONS

Almishari, et al., "Harvesting SSL Certificate Data to Identify Web-Fraud", https://arxiv.org/pdf/0909.3688.pdf, pp. 1-13, Jan. 2012, University of California Irvine.

Dong, et al., "Pinning & Binning: Real Time Classification of Certificates", https://www.cs.indiana.edu/~zhdong/publication/ACSACProposal.pdf, 2 pages, 2013, Indiana University.

Anderson et al. "Deciphering Malware's use of TLS (without Decryption)"; pp. 1-15.

\* cited by examiner

US 10,686,831 B2

MALWARE CLASSIFICATION AND ATTRIBUTION THROUGH SERVER FINGERPRINTING USING SERVER CERTIFICATE DATA

TECHNICAL FIELD

The present disclosure relates generally to computer networks, and, more particularly, to malware classification and attribution in a network through server fingerprinting using server certificate data.

BACKGROUND

Malicious network traffic can take many different forms. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, a further type of malicious network traffic includes network traffic that propagates the malware itself.

Intrusion protection systems (IPS), firewalls, and flow monitoring systems generally attempt to detect and block malicious traffic, whenever possible. However, in recent years, the amount of encrypted network traffic has increased considerably. Notably, with the advent of transport layer security (TLS) and other security mechanisms, many websites are now encrypting even traditional webpage data. This presents certain challenges to security systems as the contents of the traffic may not be available for analysis and pattern matching is generally inapplicable to encrypted traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
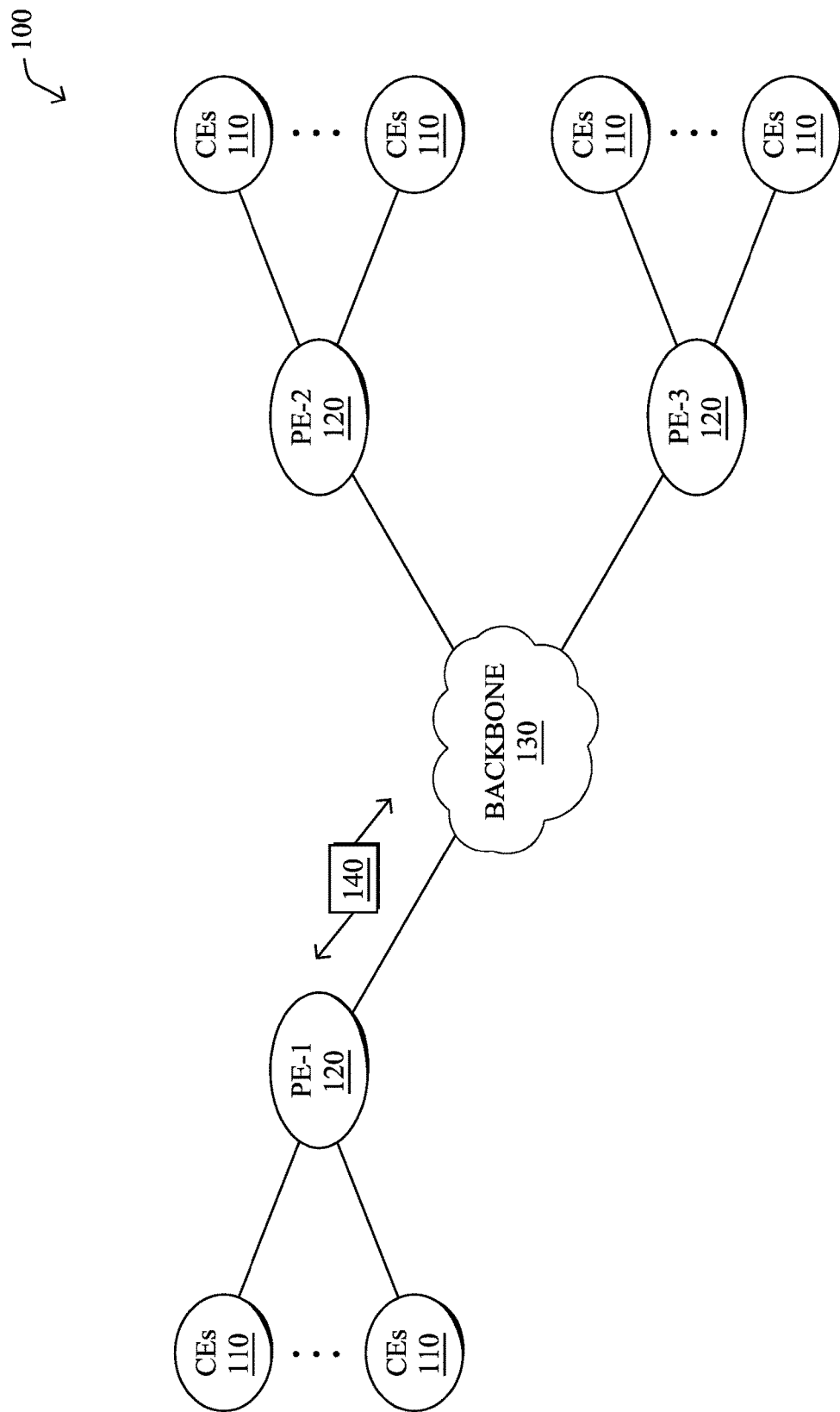
FIGS. 1A-1B illustrate an example communication network.

According to one or more embodiments of the disclosure, a device in a network receives certificate data for an encrypted traffic flow associated with a client node in the network. The device determines one or more data features from the certificate data. The device determines one or more flow characteristics of the encrypted traffic flow. The device performs a classification of an application executed by the client node and associated with the encrypted traffic flow by using a machine learning-based classifier to assess the one or more data features from the certificate data and the one or more flow characteristics of the traffic flow. The device causes performance of a network action based on a result of the classification of the application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate net81work node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
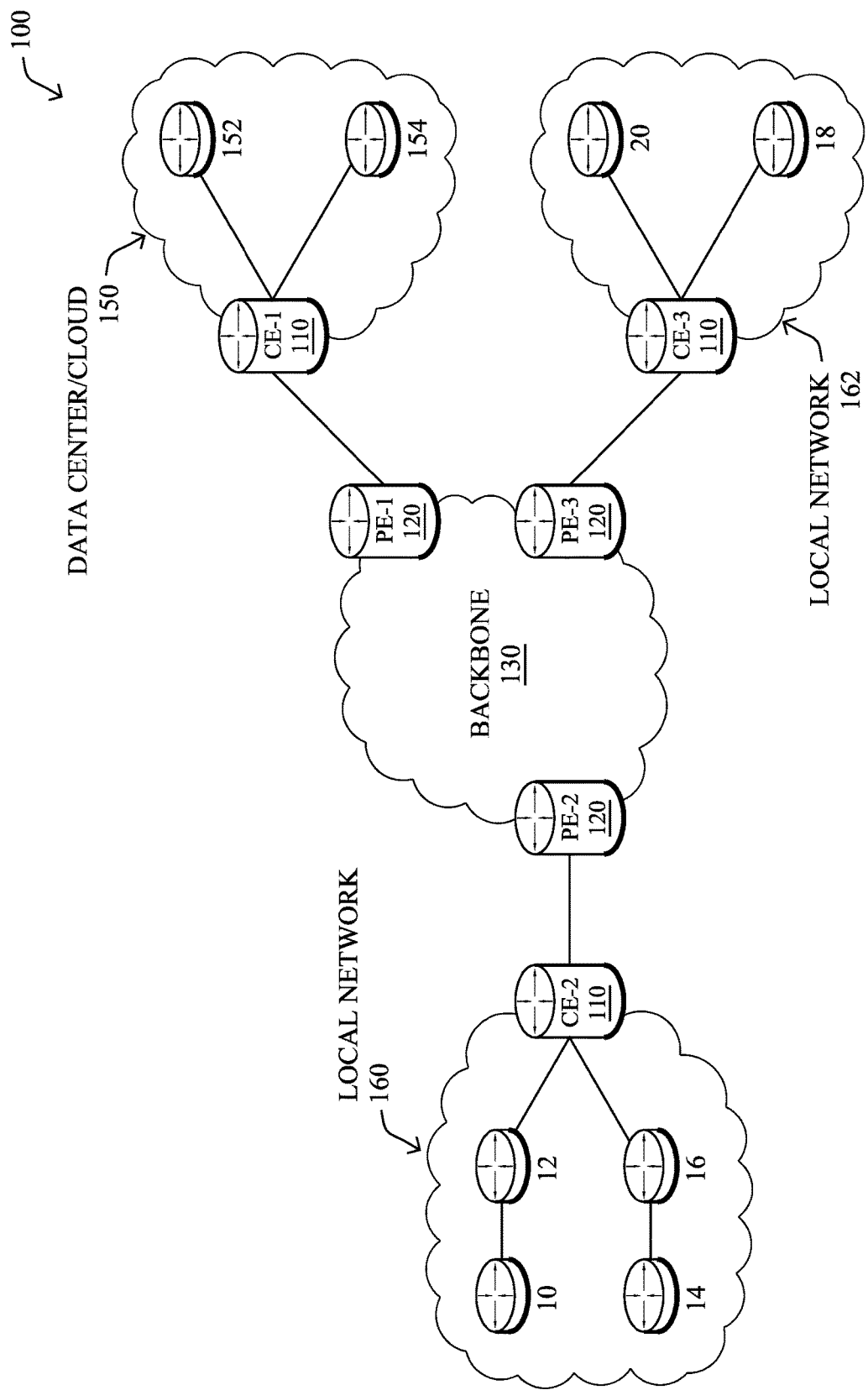

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
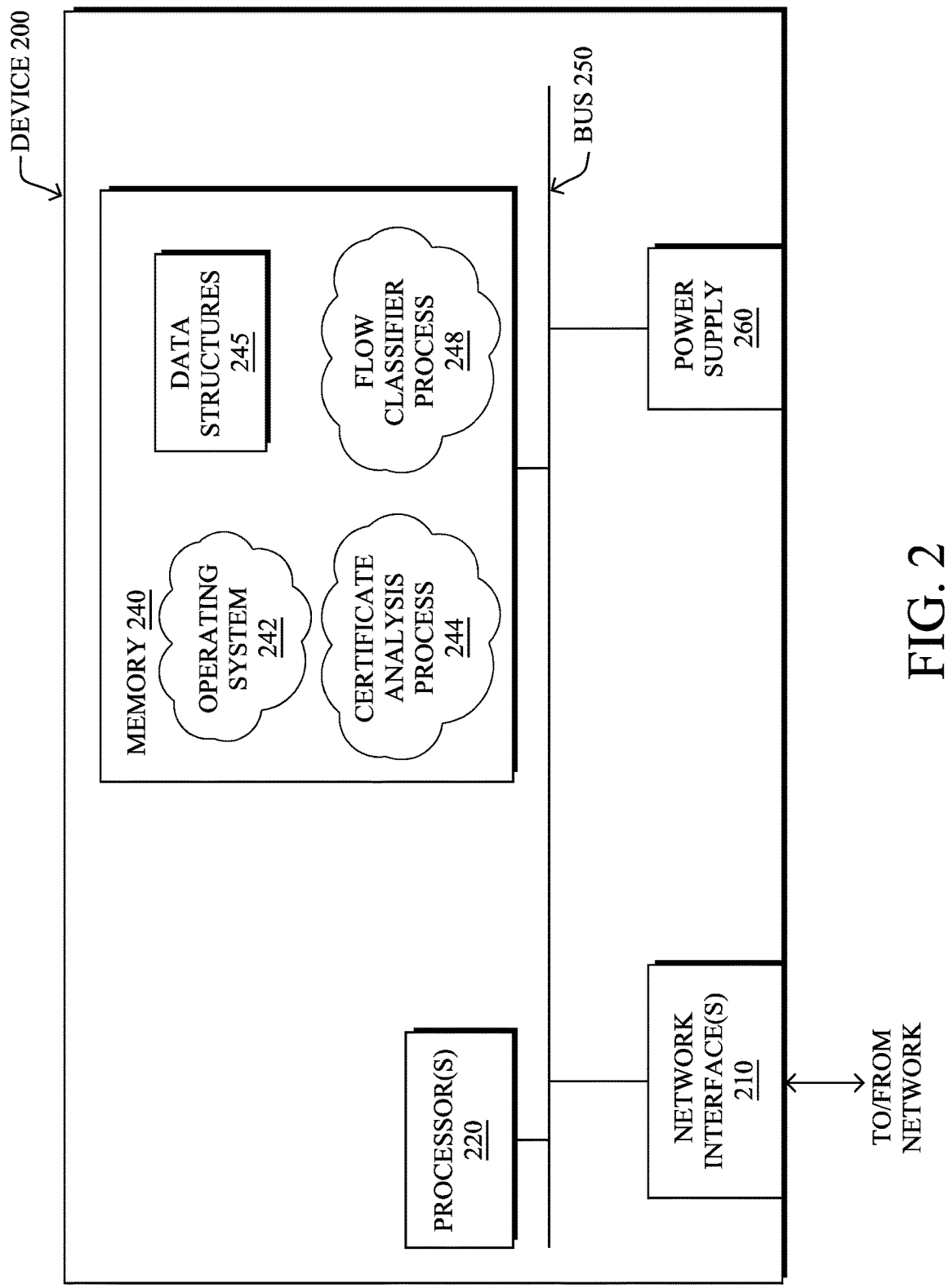
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a certificate analysis process 244 and/or a flow classifier process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, certificate analysis process 244 may be configured to capture and/or analyze certificate data associated with an encrypted traffic flow. Such a flow may be, for example, a Transport Layer Security (TLS) or Secure Socket Layer (SSL) traffic flow that uses X.509 certificates or the like. In turn, certificate analysis process 244 may provide the extracted data feature(s) of the certificate to classifier process 248 for analysis.

In general, classifier process 248 may execute one or more machine learning-based classifiers to classify encrypted traffic in the network (and its originating application) for any number of purposes. In one embodiment, classifier process 248 may assess captured traffic data to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, classifier process 248 may classify the gathered traffic data to detect other anomalous behaviors (e.g., malfunctioning devices, misconfigured devices, etc.), traffic pattern changes (e.g., a group of hosts begin sending significantly more or less traffic), or the like.

Classifier process 248 may employ any number of machine learning techniques, to classify the gathered traffic data. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, classifier process 244 can use the model M to classify new data points, such as information regarding new traffic flows in the network. Often, M is a statistical model, and the cost function is inversely proportional to the likelihood of M, given the input data.

In various embodiments, classifier process 248 may employ one or more supervised, unsupervised, or semi-supervised machine learning models. Generally, supervised learning entails the use of a training set of data, as noted above, that is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that classifier process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, classifier process 248 may assess the captured traffic data on a per-flow basis. In other embodiments, classifier process 248 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
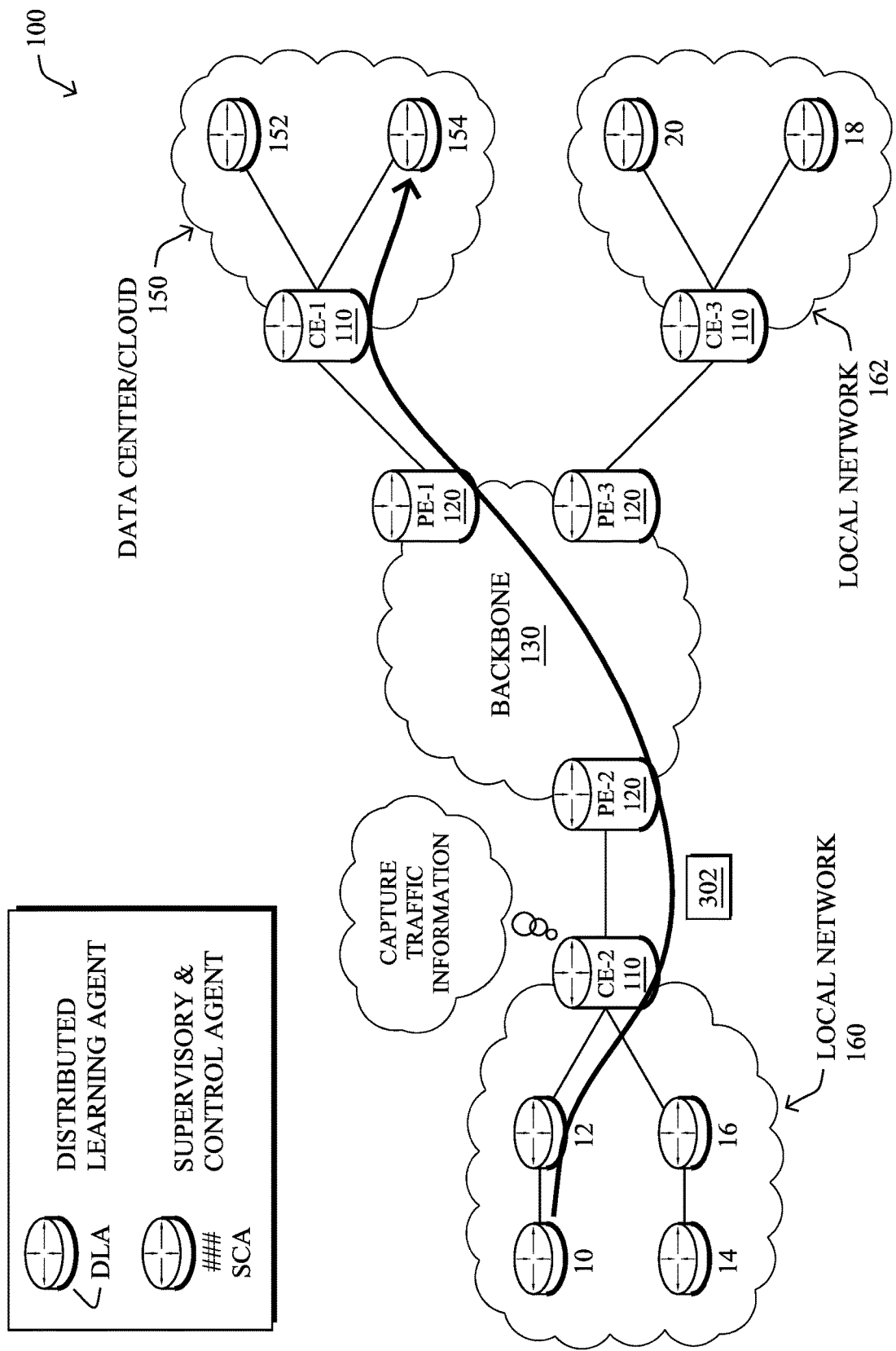
FIG. 3 illustrates an example of a network device capturing traffic data.

As shown in FIG. 3, various mechanisms can be leveraged to capture information about traffic in a network. For example, consider the case in which client node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows.

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, encryption in network traffic, and in data such as files that transit networks, is rapidly increasing. Notably, a recent test of malware indicated that approximately 10% now use TLS. This poses major challenges with respect to visibility and threat detection because certain technologies, such as deep packet inspection (DPI), cannot be applied to encrypted traffic. In terms of visibility, being able to detect encrypted traffic over unconventional ports, such as DNS, could indicate out-of-policy tunnels or data exfiltration. More specifically, the detection of cryptographic protocols independent of the ports being utilized gives valuable knowledge to network administrators. In terms of threat detection, characterizing encrypted traffic as malicious has numerous benefits and would allow network administrators to identify when encrypted files transit the network using non-encrypted protocols such as the Hypertext Transfer Protocol (HTTP), which is another data exfiltration method.

It may be possible to use a man-in-the-middle approach to decrypt and inspect encrypted network traffic. For example, a proxy between a client device and a server may act as an intermediary to obtain the cryptographic information needed to decrypt the traffic. However, such approaches are often cumbersome, raise a number of privacy concerns, and may even be prohibited by law in some jurisdictions.

Malware Classification and Attribution Through Server Fingerprinting Using Server Certificate Data The techniques herein allow for the detection of malware through the analysis of data elements extracted from server or client certificates associated with encrypted traffic flows (e.g., by a passive network monitoring device, etc.). In some aspects, the extracted data elements can be used to determine data features for input to a machine learning-based classifier or, alternatively, a rule or signature-based system. Particularly, a TLS server certificate often has a unique view of a TLS connection and the techniques herein may leverage this information for improved threat detection and threat attribution.

Specifically, according to one or more embodiments of the disclosure as described in detail below, a device in a network receives certificate data for an encrypted traffic flow associated with a client node in the network. The device determines one or more data features from the certificate data. The device determines one or more flow characteristics of the encrypted traffic flow. The device performs a classification of an application executed by the client node and associated with the encrypted traffic flow by using a machine learning-based classifier to assess the one or more data features from the certificate data and the one or more flow characteristics of the traffic flow. The device causes performance of a network action based on a result of the classification of the application.

Illustratively, the techniques described herein may be performed by hardware, software, and/or firmware, such as in accordance with flow classifier process 248, which may include computer executable instructions executed by the processor 220 to perform functions relating to the techniques described herein, e.g., in conjunction with certificate analysis process 244.

Operationally, the executing device may extract data elements from the X.509 certificate(s) from a TLS/SSL session, such as the subjectAltNames, the common name, the validity period of the certificate, or any other data available from the certificate(s). For example, CE-2 shown in FIG. 3 or another passive network monitoring device located between client node 10 and a remote server 154 may passively intercept packets 302 of the encrypted traffic flow, to capture data regarding the certificate(s) themselves and potentially the flow, as well. In turn, the captured certificate data can be used to form any number of data features for input to a machine learning-based classifier or rule-based system. In further embodiments, the certificate features can also be combined with other flow characteristics related to the TLS session (e.g., metrics regarding the traffic flow, the ciphersuite in use or offered, TLS extensions, etc.), to determine whether the application executed by the client and associated with the traffic flow is malware. If so, the classifier may also be configured to identify the malware family to which the application belongs.

A preliminary study was performed to assess the effects of analyzing certificate data for purposes of malware detection and attribution. In the study, server certificates from a large malware dataset were contrasted with other, live traffic data in production. A listing of the malware families, number of samples, and resulting encrypted flows that successfully negotiated a TLS handshake and sent application data is shown below:

TABLE 1

| Malware Family | Unique Samples | Encrypted Flows |
| --- | --- | --- |
| Bergat | 192 | 332 |
| Deshacop | 69 | 129 |
| Dridex | 38 | 103 |
| Dynamer | 118 | 372 |
| Kazy | 228 | 1,152 |
| Parite | 111 | 275 |
| Razy | 117 | 564 |
| Sality | 612 | 1,200 |
| Skeeyah | 81 | 218 |
| Symmi | 494 | 2,618 |
| Tescrypt | 137 | 205 |
| Toga | 156 | 404 |

TABLE 1-continued

| Malware Family | Unique Samples | Encrypted Flows |
|---|---|---|
| Upatre | 377 | 891 |
| Virlock | 1,208 | 12,847 |
| Virtob | 115 | 511 |
| Yakes | 100 | 337 |
| Zbot | 1,291 | 2,902 |
| Zusy | 179 | 733 |
| TOTAL | 5,623 | 25,793 |

This resulted in the following observations regarding the certificates used:

TABLE 2

| Malware Family | Number of Flows | Unique Server IPs | Number of Self-Signed Certs | Certificate Subject |
|---|---|---|---|---|
| Bergat | 332 | 12 | 0 | www.dropbox.com |
| Deshacop | 129 | 38 | 0 | *.onion.to |
| Dridex | 103 | 10 | 89 | amthonoup.cy |
| Dynamer | 372 | 155 | 3 | www.dropbox.com |
| Kazy | 1,152 | 225 | 52 | *.onestore.ms |
| Parite | 275 | 128 | 0 | *.google.com |
| Razy | 564 | 118 | 16 | baidu.com |
| Sality | 1,200 | 323 | 4 | vastusdomains.com |
| Skeeyah | 218 | 90 | 0 | www.dropbox.com |
| Symmi | 2,618 | 700 | 22 | *.criteo.com |
| Tescrypt | 205 | 26 | 0 | *.onion.to |
| Toga | 404 | 138 | 8 | www.dropbox.com |
| Upatre | 891 | 37 | 155 | *.b7websites.net |
| Virlock | 12,847 | 1 | 0 | block.io |
| Virtob | 511 | 120 | 0 | *.g.doubleclick.net |
| Yakes | 337 | 51 | 0 | baidu.com |
| Zbot | 2,902 | 269 | 507 | tridayacipta.com |
| Zusy | 733 | 145 | 14 | *.criteo.com |

With reference to Table 2 above, the certificate subject typically has a very long tail, with only the most frequent subjects reported. Notably, these certificates were mostly (i.e., slightly more than 50%) comprised of subjects that had domain generation algorithm (DGA)-like characteristics (e.g., www.33mhwt2j.net, etc.). The following certificate subjects were the most frequent for TLS flows initiated by the observed malware:
 block.io
 *.wpengine.com
 *.criteo.com
 baidu.com
 *.google.com Because the DGA-like certificate subjects are counted as unique, they do not show up in this list.

Actual enterprise data was also assessed during testing, to provide a comparison with the malware-associated TLS flows described above. From this, the certificate subjects of the servers to which the enterprise traffic most frequently involved were observed as follows:
 *.google.com
 api.twitter.com
 *.icloud.com
 *.g.doubleclick.net
 *.facebook.com Thus, while the malware mostly communicated with servers that had suspicious certificate subjects (e.g., DGA-like certificate subjects), it is also clear that malware communicates with many inherently benign servers, as well. For example, the certificate subject *.google.com appears as one of the most frequently observed for both the malware-related traffic and the benign enterprise traffic.

Figure 4A:
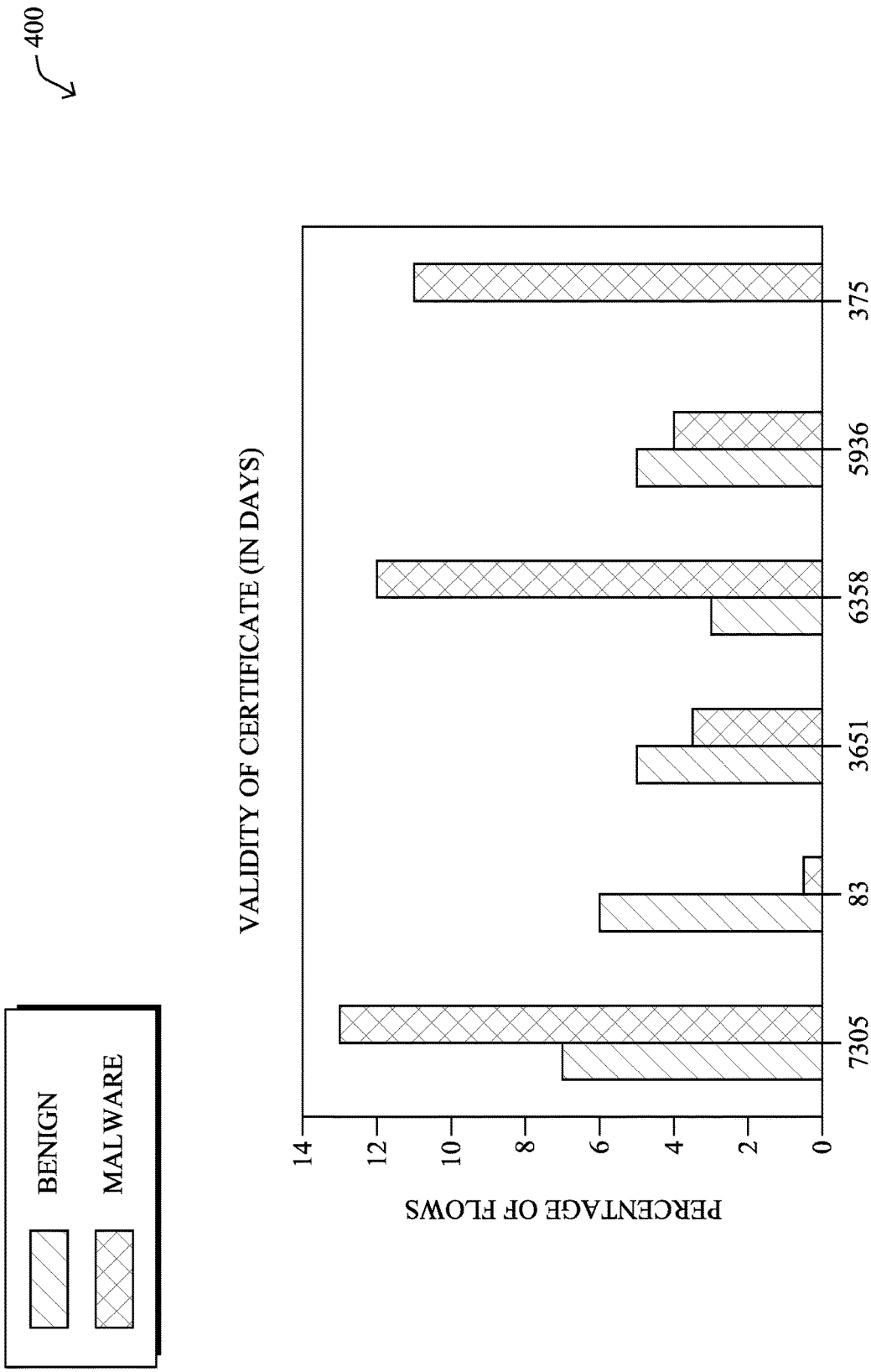
FIGS. 4A-4B illustrate example plots of certificate data features for benign and malware-generated traffic.
Figure 4B:
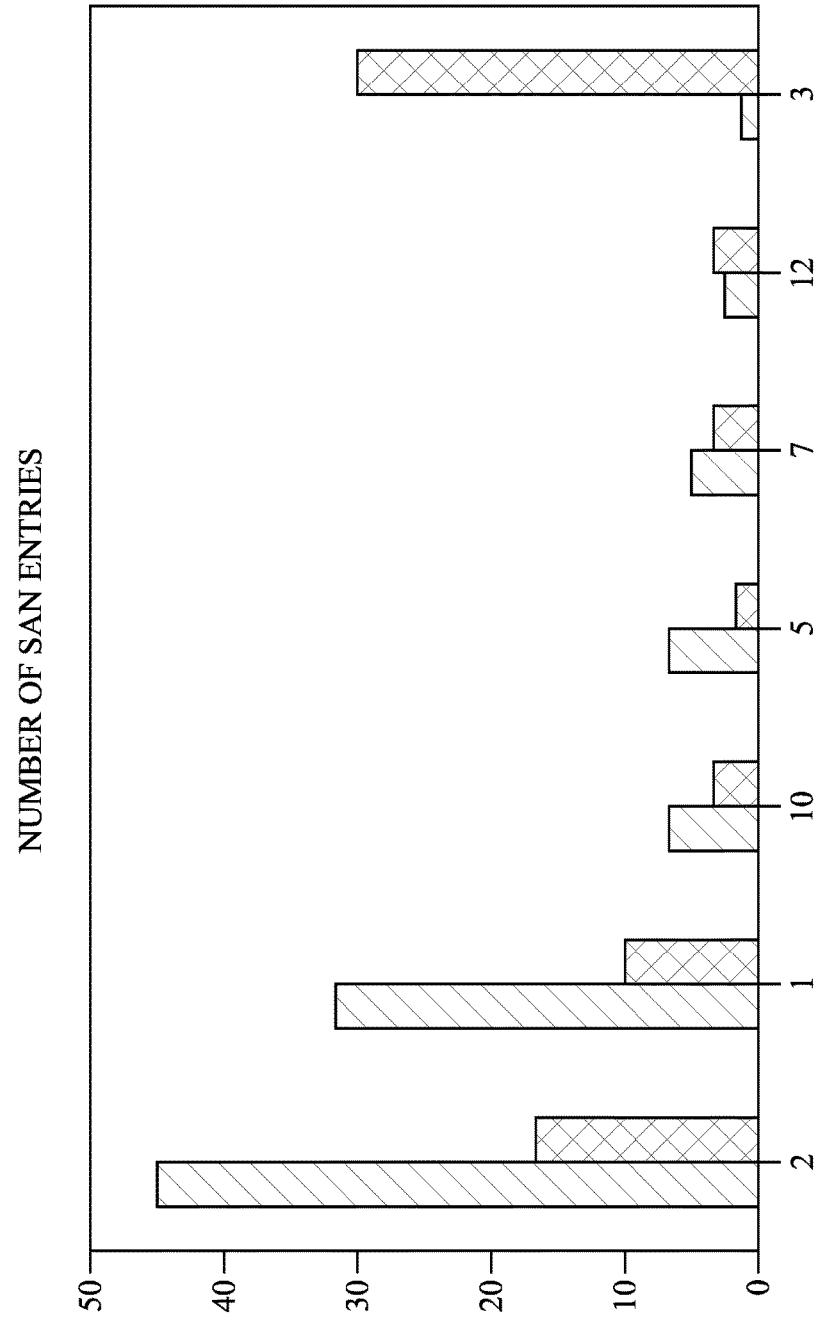

Several additional features of the certificate data were also observed to exhibit differences with that of benign traffic, example plots of which are shown in FIGS. 4A-4B, according to various embodiments. In particular, the validity of the certificate (e.g., in days, weeks, etc.) and the number of subjectAltName entries also demonstrated a difference between malware-related and benign encrypted traffic.

As shown in FIG. 4A, plot 400 illustrates the observed percentage of flows for both the benign and malware-related traffic as a function of the certificate validity in days. In FIG. 4B, plot 410 illustrates the observed number of subjectAltName (SAN) entries from the certificates of both the benign and malware-related traffic. Interestingly, the high prevalence of connections to block.io, a Bitcoin wallet, heavily skewed the validity (375 days) and number of subjectAltName entries (3) for the certificates of servers to which the malware connected.

According to various embodiments herein, one or more features extracted from certificate data can be used to train a machine learning-based classifier. For example, any or all of the following features may be used to train the classifier:
 Number of SAN entries
 Validity of the certificate in days
 Length of the certificate's subject common name identifier
 Character frequency histogram of the certificate's subject common name identifier These features are not meant to be exhaustive, but simply illustrative. Other embodiments provide for the construction of a classifier that is trained to assess other certificate data features, as well. Such a classifier may, based on the certificate data features of an encrypted flow of interest, classify the application associated with the TLS session. For example, using the above approach, the classifier may identify the application as belonging to a particular malware family. In further embodiments, the techniques herein can also be used more generally to identify the application itself, regardless of whether or not the application is malicious.

Further embodiments also provide for the classifier, which may be an ensemble classifier, to also assess characteristics of the traffic flow itself. For example, assessed flow characteristics may include, but are not limited to, sequence of packet lengths and time (SPLT) data regarding the traffic flow, sequence of application lengths and time (SALT) data regarding the traffic flow, or byte distribution (BD) data regarding the traffic flow. Further flow characteristics may include TLS context data such as the ciphersuite offered, user agent, TLS extensions, or the like.

Based on the classification of the application and traffic flow, the classifying device may cause the performance of one or more network actions. For example, in the case of the network monitoring device (e.g., CE-2 in FIG. 3, another intermediary networking device, etc.), the device may cause the traffic flow to be blocked, rerouted, or receive a lower priority. In another example, the device may send out one or more notifications based on the classification, such as an alert to a network administrator when malware is detected. Since the classification itself is performed within the flow monitoring framework, this differs considerably from post-processing, forensic approaches, and allows for any number of network actions to be performed in response to the classification. In further cases, if the classifier is configured to simply identify the application associated with the encrypted traffic flow, the device may cause any number of appropriate quality of service (QoS) parameters to be set in the network regarding the flow.

A prototype was constructed using the techniques herein to distinguish between malicious encrypted flows and benign, enterprise encrypted flows. Notably, a 11-logistic regression classifier was first constructed to assess flows without taking into consideration the associated certificate data, which demonstrated a 1-in-10 k false discovery rate (FDR) accuracy of 70.5%. By reformulating the classifier to also consider the TLS certificate features, this accuracy increased to 86.1%. Even further improvements were noted by using a classifier that also assesses TLS metadata, SPLT, BD, TLS, and self-signed certificate features, with an improvement of approximately 1.5% at a 1-in-10 k FDR.

Unsurprisingly, the certificate data features proposed herein also significantly helped to attribute encrypted flows to a particular malware family during family. In other words, certificate data features can be used to differentiate between two otherwise identical malware families. For instance, Zusy and Zbot were often classified as each other, since they have similar TLS clients and use similar cryptographic parameters. However, it was also found that these two families connect to very different types of servers (e.g., Zusy connects to ad services and Zbot connects to unpopular compromised domains). Thus, leveraging the information in the server certificate makes family attribution much more reliable. Testing has shown that by also assessing the certificate data features, classification of a single encrypted flow to the correct family increased to 94.1% of the time from 90.3% of the time without these features.

Figure 5:
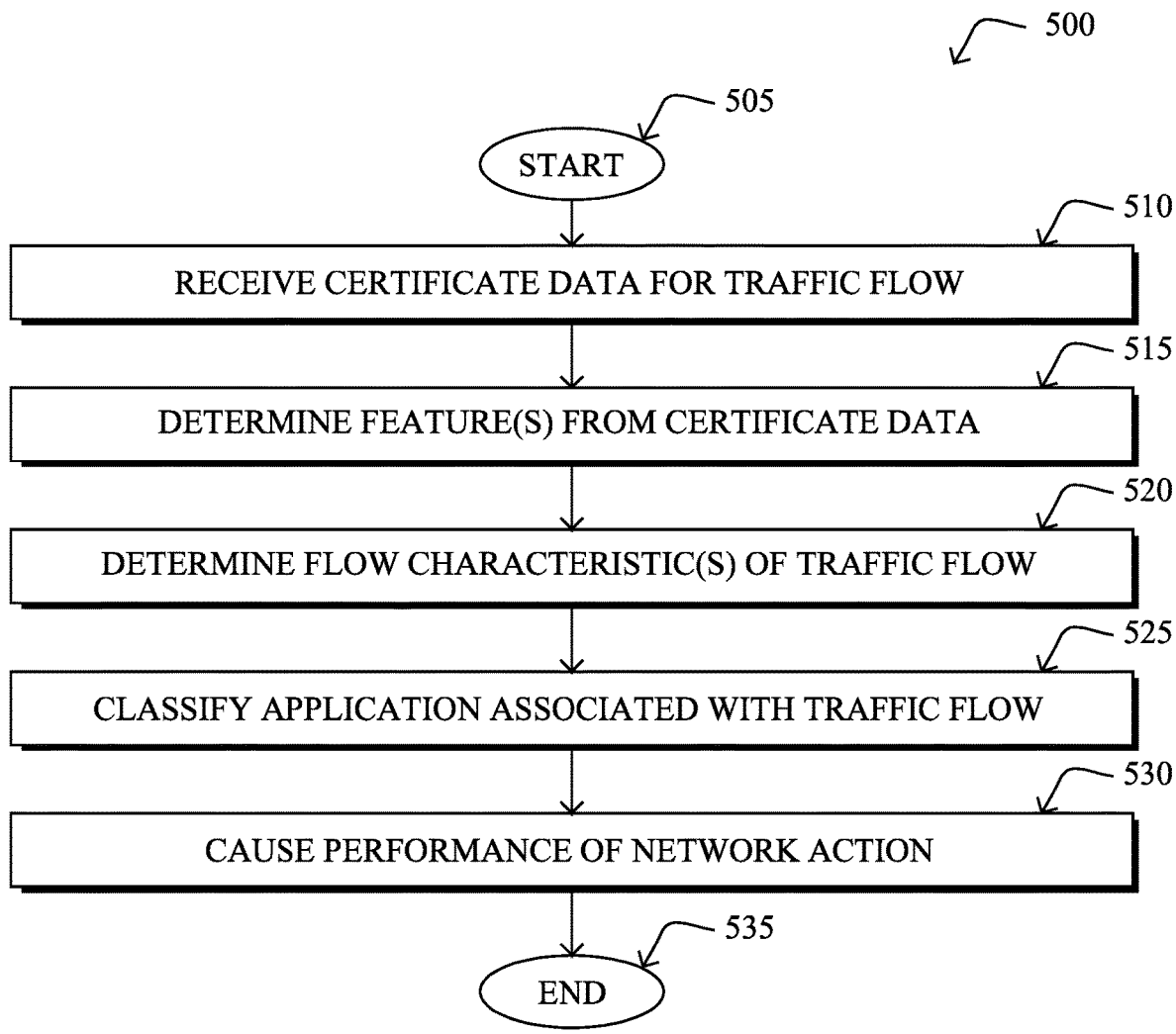
FIG. 5 illustrates an example simplified procedure for using certificate data to classify an application.

FIG. 5 illustrates an example simplified procedure for using certificate data to classify an application in a network, in accordance with one or more embodiments described herein. For example, a non-generic, specifically configured device (e.g., device 200) may perform procedure 500 by executing stored instructions (e.g., process(es) 244, 248). The procedure 500 may start at step 505, and continues to step 510, where, as described in greater detail above, the device may receive certificate data for an encrypted traffic flow associated with a client node in the network. For example, in some cases, the device may be a flow monitoring networking device, such as a router, switch, or other flow monitoring device (e.g., the device may intercept the flow during forwarding to capture the certificate data). In other cases, the device may receive the certificate data from such a flow monitoring device.

At step 515, as detailed above, the device may determine one or more data features from the certificate data. For example, the device may extract from the certificate data a subjectAltName entry, a certificate validity time period, a subject common name identifier, or any other information that can be extracted from the certificate data.

At step 520, the device may also determine one or more flow characteristics of the encrypted flow, as described in greater detail above. For example, the device may determine sequence of packet lengths and time (SPLT) data regarding the traffic flow, sequence of application lengths and time (SALT) data regarding the traffic flow, or byte distribution (BD) data regarding the traffic flow. Additional features regarding the flow may also include TLS metadata (e.g., the ciphersuite, etc.) or any other information that can be garnered about the encrypted traffic flow without resorting to a man-in-the-middle interception approach.

At step 525, as detailed above, the device may perform a classification of an application executed by the client node and associated with the encrypted traffic. Typically, such a classification may be to determine whether the application is malware and, if so, potentially the malware family to which the application belongs. However, in further cases, the classification may be to simply identify the application as being one of a plurality of benign applications, as well. In various embodiments, the device may use a machine learning-based classifier to assess the certificate data features and the traffic flow characteristics and classify the application. For example, the device may use a logistic regression classifier, to determine the classification of the application. In further cases, the device may use the certificate data features as input to a rule-based analyzer that uses predefined rules to make a classification.

At step 530, the device may cause the performance of one or more network actions based on the classification, as described in greater detail above. For example, if the application/traffic flow are determined to be malware-related, the device may send a notification to an administrator and/or adjust how the network handles the traffic flow (e.g., by causing the traffic to be blocked, rerouted, etc.). Similarly, even if the application is found to be benign, the device may effect any number adjustments based on the application type from the classification. Procedure 500 then ends at step 535.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, leverage TLS client and/or server features to better understand TLS communications initiated by malicious programs. In some cases, the TLS server features can be used to improve the performance of a machine learning-based malware classifier by a statistically significant margin. Further, the TLS server certificate data features allow for more accurate threat attribution and provide an intuitive view into the malware's behavior, e.g., malware connecting to block.io most likely will have Bitcoin motivations. Additionally, the collection of the server certificate data can be performed passively and in an lightweight manner. Furthermore, it is an orthogonal method to infer domain names, which is important because DNS is not always available.

While there have been shown and described illustrative embodiments that provide for the detection and classification of malware and application types, it is to be understood that various other adaptations and modifications may be made within the spirit and scope of the embodiments herein. For example, while certain embodiments are described herein with respect to using certain models for purposes of classification and analysis, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    obtaining, by a device in a network, telemetry data regarding an encrypted traffic flow, the encrypted traffic flow passively intercepted in the network and associated with a client node in the network, wherein the telemetry data comprises certificate data captured from the encrypted traffic flow, wherein the device passively intercepts the telemetry data without a man-in-the-middle;
    determining, by the device, one or more data features from the certificate data;
    determining, by the device, one or more flow characteristics of the intercepted encrypted traffic flow from the telemetry data;
    performing, by the device, a classification of an application executed by the client node and associated with the intercepted encrypted traffic flow by using a machine learning-based classifier to assess the one or more data features from the certificate data and the one or more flow characteristics of the traffic flow, wherein the machine learning classifier assesses the certificate data of the encrypted traffic flow without decrypting the encrypted traffic flow; and
    causing, by the device, performance of a network action based on a result of the classification of the application.

2. The method as in claim 1, wherein the classification indicates that the application is malware.

3. The method as in claim 1, wherein the network action comprises at least one of: blocking the traffic flow or sending a notification in the network regarding the classification.

4. The method as in claim 1, wherein the one or more flow characteristics comprise one or more of: sequence of packet lengths and time (SPLT) data regarding the traffic flow, sequence of application lengths and time (SALT) data regarding the traffic flow, byte distribution (BD) data regarding the traffic flow, a ciphersuite, or a Transport Layer Security (TLS) extension.

5. The method as in claim 1, wherein the one or more data features from the certificate data comprise one or more of: a subjectAltName entry, a certificate validity time period, or a subject common name identifier.

6. The method as in claim 1, wherein the machine-learning classifier is configured to assess one or more of: a length of a subject common name identifier, a character frequency of the subject common name identifier, a certificate validity time period, or a number of subjectAltName entries.

7. The method as in claim 1, further comprising:
    performing, by the device, the classification of the application based in part on an assessment of the one or more data features from the certificate data by a rule-based analyzer.

8. The method as in claim 1, further comprising:
    using, by the device, a training set of one or more data features of a plurality of certificates to train the machine learning-based classifier.

9. An apparatus, comprising:
    one or more network interfaces to communicate with a network;
    a processor coupled to the network interfaces and configured to execute one or more processes; and
    a memory configured to store a process executable by the processor, the process when executed operable to:
        obtain telemetry data regarding an encrypted traffic flow, the encrypted traffic flow passively intercepted in the network and associated with a client node in the network, wherein the telemetry data comprises certificate data captured from the encrypted traffic flow, wherein the apparatus passively intercepts the telemetry data without a man-in-the-middle;
        determine one or more data features from the certificate data;
        determine one or more flow characteristics of the intercepted encrypted traffic flow from the telemetry data;
        perform a classification of an application executed by the client node and associated with the intercepted encrypted traffic flow by using a machine learning-based classifier to assess the one or more data features from the certificate data and the one or more flow characteristics of the traffic flow, wherein the machine learning classifier assesses the certificate data of the encrypted traffic flow without decrypting the encrypted traffic flow; and
        cause performance of a network action based on a result of the classification of the application.

10. The apparatus as in claim 9, wherein the classification indicates that the application is malware.

11. The apparatus as in claim 9, wherein the network action comprises at least one of: blocking the traffic flow or sending a notification in the network regarding the classification.

12. The apparatus as in claim 9, wherein the one or more flow characteristics comprise one or more of: sequence of packet lengths and time (SPLT) data regarding the traffic flow, sequence of application lengths and time (SALT) data regarding the traffic flow, byte distribution (BD) data regarding the traffic flow, a ciphersuite, or a Transport Layer Security (TLS) extension.

13. The apparatus as in claim 9, wherein the one or more data features from the certificate data comprise one or more of: a subjectAltName entry, a certificate validity time period, or a subject common name identifier.

14. The apparatus as in claim 9, wherein the machine-learning classifier is configured to assess one or more of: a length of a subject common name identifier, a character frequency of the subject common name identifier, a certificate validity time period, or a number of subjectAltName entries.

15. The apparatus as in claim 9, wherein the process when executed is further operable to:
    perform the classification of the application based in part on an assessment of the one or more data features from the certificate data by a rule-based analyzer.

16. The apparatus as in claim 9, wherein the process when executed is further operable to:
    use a training set of one or more data features of a plurality of certificates to train the machine learning-based classifier.

17. The apparatus as in claim 9, wherein the apparatus receives the certificate data for the encrypted traffic flow by intercepting the traffic flow.

18. A tangible, non-transitory, computer-readable medium storing program instructions that cause a networking device in a network to execute a process comprising:
    obtaining, by a device in a network, telemetry data regarding an encrypted traffic flow, the encrypted traffic flow passively intercepted in the network and associated with a client node in the network, wherein the telemetry data comprises certificate data captured from the encrypted traffic flow, wherein the device passively intercepts the telemetry data without a man-in-the-middle;

determining, by the device, one or more data features from the certificate data;

determining, by the device, one or more flow characteristics of the intercepted encrypted traffic flow from the telemetry data;

performing, by the device, a classification of an application executed by the client node and associated with the intercepted encrypted traffic flow by using a machine learning-based classifier to assess the one or more data features from the certificate data and the one or more flow characteristics of the traffic flow, wherein the machine learning classifier assesses the certificate data of the encrypted traffic flow without decrypting the encrypted traffic flow; and causing, by the device, performance of a network action based on a result of the classification of the application.

19. The computer-readable medium as in claim 18, wherein the one or more data features from the certificate data comprise one or more of: a subjectAltName entry, a certificate validity time period, or a subject common name identifier.

20. The computer-readable medium as in claim 18, wherein the one or more flow characteristics comprise one or more of: sequence of packet lengths and time (SPLT) data regarding the traffic flow, sequence of application lengths and time (SALT) data regarding the traffic flow, byte distribution (BD) data regarding the traffic flow, a ciphersuite, or a Transport Layer Security (TLS) extension.

* * * * *